(12) United States Patent
Oehler, Jr.

(10) Patent No.: US 6,427,630 B1
(45) Date of Patent: Aug. 6, 2002

(54) KIT FOR THE CONSTRUCTION OF A SUBTERRANEAN SHELTER FOR ANIMALS

(76) Inventor: Albert C. Oehler, Jr., 2683 Adams Rd., Blanchester, OH (US) 45107

( * ) Notice: Subject to any disclaimer, the term of this patent is extended or adjusted under 35 U.S.C. 154(b) by 0 days.

(21) Appl. No.: 09/835,275

(22) Filed: Apr. 16, 2001

(51) Int. Cl.[7] .......................... A01K 1/00; A01K 1/035
(52) U.S. Cl. ........................................ 119/486; 119/484
(58) Field of Search ................................ 119/484, 485, 119/486; 211/85.18, 85.22; 135/90

(56) References Cited

U.S. PATENT DOCUMENTS

| | | | | | |
|---|---|---|---|---|---|
| 921,855 | A | * | 5/1909 | Loskamp | 211/85.22 |
| 2,034,156 | A | * | 3/1936 | Snider | 119/486 |
| 2,865,385 | A | * | 12/1958 | Crafts | 135/90 |
| 3,442,275 | A | * | 5/1969 | Ternes | 135/90 |
| 4,367,695 | A | * | 1/1983 | Lance | 119/485 |
| 5,575,239 | A | * | 11/1996 | Bradburn et al. | 119/484 |
| 5,809,936 | A | * | 9/1998 | Wall | 119/484 |

* cited by examiner

Primary Examiner—Charles T. Jordan
Assistant Examiner—Elizabeth Shaw
(74) Attorney, Agent, or Firm—Neal O. Willmann

(57) ABSTRACT

A kit for converting a cylindrical container into a subterranean animal shelter includes a cradle for supporting and stabilizing the container when placed on its side; a curtained door; and a piece of material, typically netting, large enough to drape the container, forming a tent, and to support the placement of soil to substantially cover the container with a mound of dirt to permit the sewing of vegetation or laying of sod, thus creating a secure and comfortable subterranean shelter.

6 Claims, 1 Drawing Sheet

KIT FOR THE CONSTRUCTION OF A SUBTERRANEAN SHELTER FOR ANIMALS

BACKGROUND OF THE INVENTION

This invention relates, in general, to backyard housing for domesticated animals, typically pets; and, in most instances, the disclosed abode will be described primarily in terms descriptive of, and relevant to, housing for the family's favorite pets.

DESCRIPTION OF THE PRIOR ART

Earlier inventors, for various reasons, have been motivated to apply their creativity to the design and creation of subterranean shelters for animals. For instance, U.S. Pat. No. 2,034,156, issued Mar. 17, 1936, to Snider, discloses a den for foxes. The den is designed to be buried in the earth up to one-half its height with additional dirt piled up around the sides and up to the rim of the removable lid. The den is described as well-insulated and therefore warm in the winter and cool in the summer.

U.S. Pat. No. 2,324,339, issued Jul. 13, 1943, to Vanbussum, describes an elaborate subterranean den with tunnels to provide wildlife with a suitable habitat for whelping and rearing their young.

U.S. Pat. No. 2,795,208, issued Jun. 11, 1957, to Rasmussen, describes a combination of underground and an above-ground enclosures providing an option for a confined animal, ideally resulting in a healthier animal with a more marketable pelt.

U.S. Pat. No. 5,809,936, issued Sep. 22, 1998, to Wall describes a virtual subterranean pleasure dome decreed by the inventor to have a foyer for unhindered entry and egress, a venting and air heating system coupled to the master's residence and a ventilation outlet conduit for automatically refreshing the air within the housing with clean and aromatically pleasing air.

While the housing kit disclosed herein falls woefully short when it comes to providing the amenities and creature comforts for man's most favored domesticated creature described in the disclosures of the prior art, the disclosed housing kit offers simpler yet inventively distinct features that are more suitable for mass-marketing an uncomplicated structure ideally suited for housing the family pet in clean and comfortable backyard quarters.

SUMMARY OF THE INVENTION

Essentially, the disclosed animal shelter is presented in the form of a kit facilitating the construction of a subterranean animal shelter from a cylindrical container. More specifically, the kit comprises a cradle for stabilizing and supporting the cylindrical container when placed on its side; a curtained door to provide for easy entry and exit by the occupant of the shelter; and a piece of material, sufficiently sized to drape over the container, forming a tent to support the placement of soil and sod to substantially cover the container, thus creating the subterranean shelter. A preferred embodiment of the kit will include the above-listed items neatly enclosed within said container or sold with instructions for obtaining and refurbishing a used container.

DESCRIPTION OF THE PREFERRED EMBODIMENTS

Figure 1:
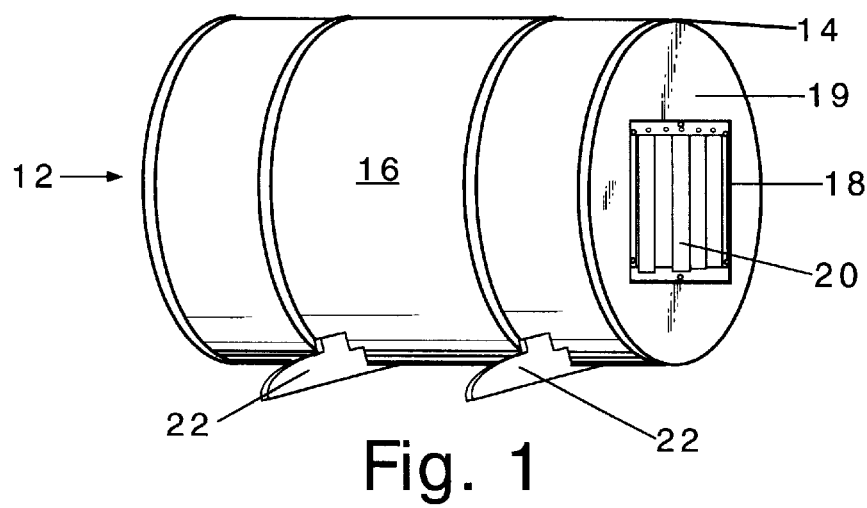
FIG. 1 is a perspective view of the disclosed shelter kit prior to draping with the soil-supporting and stabilizing material.

A full understanding of the disclosed shelter is afforded by referring directly to the four views of the drawing. FIG. 1 presents a perspective view of the disclosed shelter 10 without the draping 24. In this depiction, the cylindrical container 12 is shown resting on its side 16 and supported by a pair of cradles 22. Typically, the container has a top 14, a bottom (not shown) and a continuously curving side 16. These containers are frequently found in 55 and 30 gallon sizes and are fabricated from either metal or plastic materials. They can be new or unused but are frequently offered for sale by manufacturers who receive large quantities of chemicals, reagents or solvents in the course of their business.

When placed on its side, of course, the cylindrical container 12 is unstable and possesses very little inertia. A slight slope or lateral force is all that is necessary to reposition the container away from the desired location. To stabilize the container 12, the shelter kit 10 will provide a pair of cradles 22 that will be positioned fore and aft of the container as it rests on its continuously curving side 16.

Figure 3:
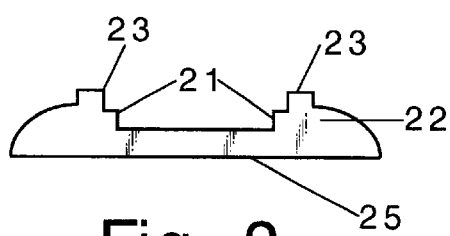
FIG. 3 is an elevated frontal view of the support cradle

In FIG. 3, a detailed depiction of a preferred cradle 22 shows that it will have a substantially flat bottom surface 25 and a notched upper surface. In this particular embodiment, the cradle 22 has two pairs of notches 21 and 23 for accommodating two different sizes of containers. Notches 21 will permit the stable cradling of a smaller container than notches 23, which are farther apart. Typically, notches 21 will accommodate a 30 gallon container and notches 23 will cradle a 55 gallon container or drum.

Returning again to FIG. 1, it is apparent that a portal is provided to allow and permit entry and egress to and from the interior of the container 14. Preferably, this portal is provided in the top 14 of the container and is framed by door 18. The door is further adorned with a curtain or portiere 20 positioned over the opening of the door to provide additional comfort, and perhaps an element of privacy, to the inhabitant of the shelter by offering protection from the elements. The door could be any size or shape, but a substantially rectangular door has been found to be easy and inexpensive to construct and install. Furthermore, the door can be fabricated from any of a variety of materials, but currently a plastic frame is performing nicely.

Figure 4:
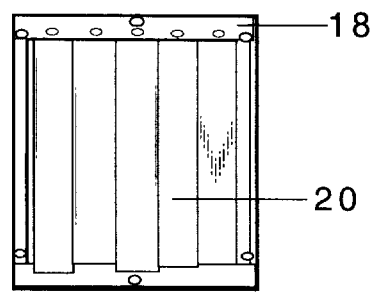
FIG. 4 is an elevated frontal view of the curtained door.

The curtain or portiere 20 need be nothing special, but current manufacturing specifications call for a series of rubber or soft plastic flaps or strips that are longitudinally suspended from the top of the door frame 18. FIG. 4 provides an enlarged depiction of the door 18 and curtain 20.

Figure 2:
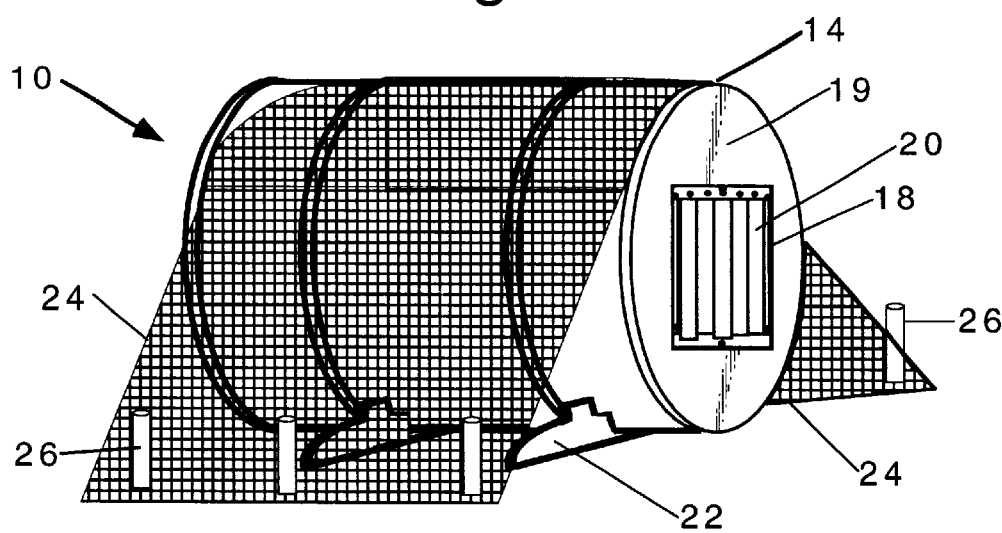
FIG. 2 is a perspective view of the disclosed shelter draped with the soil-supporting material.

FIG. 2 provides a depiction of the disclosed kit 10 fully assembled and ready to cover or bury with soil or earth. To facilitate the "burial", the kit provides a piece of cloth 24 that is large enough to drape over cylindrical container 12 as it rests on its continuously curving side 16 on the paired cradles 22, which, in turn, rest securely on the ground. The material is draped over the container in a tent-like fashion, and it is suggested that the corners of the material be secured to the ground by pegs 26. These pegs may or need not be part of the kit. They perform their function during the "burial" process, and they are ultimately covered by soil, so their appearance and durability need not be remarkable. Clearly, a preferred embodiment of the disclosed kit would include stakes, if only to simplify construction of the kit.

This draped material 24 can be fashioned from any of a variety of materials, but a woven mesh material, similar to the material currently being used by landscapers to secure and stabilize sewn seed and protective mulch on barren and exposed plots of land, has been used advantageously in this application.

The draping, once in place over the container, as depicted in FIG. 2, is buried with dirt, soil or sand to cover all sides but the top side 14, which, of course, has the portal with its door 18 and curtain 20 for easy and unassisted entry and exit. The "burial" will be facilitated by the draping material, which will stabilize the earth, allowing it to form a neat and smooth mound resembling a storm shelter or tumulus. After the mounding of earth over the shelter has been completed and stabilized, it can be covered with sod, blankets of turf, or seeded to encourage the growth of vegetation such as grass or ground cover. A covering of vigorously growing vegetation would provide the ultimate in stability and insulation. And, of course, an insulated shelter will be a comfortable shelter. It will be cool in summer, warm in winter and dry year-round. A subterranean shelter constructed by employing the elements of the disclosed kit will be unaffected by high winds, and, except for an occasional cleaning, require little or no maintenance.

With regard to caring for the interior of the shelter, it will require, or at least benefit from, an occasional cleaning. Ideally, the shelter will be swept free of used bedding material such as straw or wood chips, and hosed-out with water on a regular schedule. To facilitate the removal of wash water, the continuously curving side 16 of the cylinder adjacent to the ground will have small apertures or holes (not shown) to permit the wash water to drain in the ground.

While the foregoing is a complete and detailed description of the preferred embodiments of the disclosed shelter kit, numerous variations and modifications may be employed to implement the all-important purpose of the disclosure without departing from the spirit of the invention; and, therefore, the elaboration provided herein should not be assumed to limit, in anyway, the scope of the invention which is fairly defined by the appended claims.

What is claimed is:

1. A kit for the conversion of a cylindrical container into a subterranean animal shelter, said kit comprising: a cradle for supporting and stabilizing the container when placed on its side; a curtained door; and a piece of material of sufficient size to drape the container, forming a tent, to support the placement or soil to substantially cover said container, creating the subterranean shelter.

2. The kit according to claim 1 further including a cylindrical container.

3. The kit according to claim 1 wherein the material is a woven netting.

4. The kit according to claim 1 wherein the cradle is a pair of rests.

5. The kit according to claim 1 wherein the door is a frame, generally rectangular in shape.

6. The kit according to claim 1 further including stakes to secure the corners of the draping material to the ground.

* * * * *